US011061621B2

(12) United States Patent
Li et al.

(10) Patent No.: US 11,061,621 B2
(45) Date of Patent: Jul. 13, 2021

(54) DATA PROCESSING METHOD, ELECTRONIC APPARATUS, AND COMPUTER-READABLE STORAGE MEDIUM

(71) Applicant: Shenzhen Intellifusion Technologies Co., Ltd., Guangdong (CN)

(72) Inventors: Wei Li, Guangdong (CN); Qingxin Cao, Guangdong (CN)

(73) Assignee: Shenzhen Intellifusion Technologies Co., Ltd., Guangdong (CN)

(*) Notice: Subject to any disclaimer, the term of this patent is extended or adjusted under 35 U.S.C. 154(b) by 0 days.

(21) Appl. No.: 17/257,324

(22) PCT Filed: Nov. 28, 2019

(86) PCT No.: PCT/CN2019/121602
§ 371 (c)(1),
(2) Date: Dec. 31, 2020

(87) PCT Pub. No.: WO2020/238106
PCT Pub. Date: Dec. 3, 2020

(65) Prior Publication Data
US 2021/0173590 A1 Jun. 10, 2021

(30) Foreign Application Priority Data
May 24, 2019 (CN) .......................... 201910444607.1

(51) Int. Cl.
*G06F 15/80* (2006.01)
*G06F 3/06* (2006.01)
*G06N 3/08* (2006.01)
*G06N 3/04* (2006.01)

(52) U.S. Cl.
CPC .......... *G06F 3/0659* (2013.01); *G06F 3/0604* (2013.01); *G06F 3/0673* (2013.01); *G06N 3/04* (2013.01); *G06N 3/08* (2013.01)

(58) Field of Classification Search
CPC .... G06F 3/0659; G06F 3/0604; G06F 3/0673; G06N 3/04; G06N 3/08
See application file for complete search history.

(56) References Cited

U.S. PATENT DOCUMENTS

| 10,831,702 B2* | 11/2020 | Jacob (Yaakov) ........................... G06F 15/8046 |
| 2019/0095776 A1* | 3/2019 | Kfir ............................ G06F 9/30 |
| 2019/0392297 A1* | 12/2019 | Lau ........................... G06N 3/04 |

FOREIGN PATENT DOCUMENTS

CN 109740732 A 5/2019

* cited by examiner

*Primary Examiner* — Cheng Yuan Tseng (57) ABSTRACT

A data processing method includes: an electronic device concurrently sending N storage requests for Q times to a memory in each polling by a processor, wherein the N storage requests are used for requesting the memory to store N rows of output data generated by N processing elements having continuous identifications among M processing elements, and Q is determined according to the number M of the processing elements and the number N of the storage requests; and by means of the memory, the electronic device storing a P-th row of output data generated by each of the M processing elements in a P-th polling according to received Q×N storage requests received from the processor. The present method can solve the problem of lower data storage efficiency in existing neural network models, a plurality of pieces of data may be stored at the same time by triggering concurrent requests to improve storage efficiency.

8 Claims, 4 Drawing Sheets

FIG. 6

DATA PROCESSING METHOD, ELECTRONIC APPARATUS, AND COMPUTER-READABLE STORAGE MEDIUM

1. Cross-Reference to Related Application

This application claims priority to Chinese Patent Application No. 201910444607.1, entitled "DATA PROCESSING METHOD, ELECTRONIC APPARATUS AND COMPUTER-READABLE STORAGE MEDIUM" and filed on May 24, 2019, the content of which is hereby incorporated by reference in its entirety.

2. Technical Field

The present disclosure generally relates to information processing technologies field, and especially relates to a data processing method, an electronic apparatus and a computer readable storage medium.

3. Description of Related Art

Neural network is an algorithm mathematical model for processing distributed parallel information that mimics behavioral characteristics of animal neural networks. The network is consisted of a large number of nodes (or namely neurons) connected with together by star-lakes, by adjusting inter-connected relationship between the large number of nodes, input data and weights are configured to generate output data to simulate an information processing process of human brain for processing information, and generate results after pattern recognition.

For a neural network operation, if the neural network operation has multi-layer operation, input neurons and output neurons of the multi-layer operation don't refer to, the neurons in an input layer and an output layer of the entire neural network, but for any two adjacent layers in the network, the neurons in a lower layer of network positive operation, that is, the input neurons, and the neurons in an upper layer of network positive operation is the output neurons. Taking a convolutional neural network model as an example, it is assumed that convolutional neural network includes L layers, K=1, 2, . . . , (L−1), for a K-th layer and a (K+1)-th layer, the K-th layer is referred to as an input layer, in which neurons are input neurons, and the (K+1)-th layer is referred to as an output layer, in which neurons are output neurons. In other words, each layer except a top layer can be used as the input layer, and a next layer is a corresponding output layer.

In a calculation process of the neural network model, an output result calculated by a previous layer in the neural network model is as an input of a latter layer in the neural network model. In general, the processor is configured to store the output result calculated by the previous layer in the neural network model into a corresponding output data buffer, when calculating the latter layer, the processor is needed to first read the output result of the previous layer from the output data buffer, and then take the output result as an input of a current layer for calculation. In conventional technologies, when the processor is configured to store the output result calculated by the previous layer in the neural network model into the corresponding output data buffer, low storage efficiency.

SUMMARY

The technical problems to be solved: in view of the shortcomings of the related art, the present disclosure relates to a data processing method, an electronic apparatus and a computer readable storage medium which can simultaneously store a plurality of pieces of data by triggering concurrent requests to solve a problem of low data storage efficiency in conventional neural network models, and improve storage efficiency.

In a first aspect, a data processing method according to an embodiment of the present disclosure applied to an electronic apparatus, the electronic apparatus including a processor and a memory, the processor including M processing elements, each processing element including an identification, and the M processing elements arranged in sequence according to the identifications, wherein M is a positive integer, the method includes:

sending N storage requests for Q times to a memory in parallel in each polling by the processor of the electronic apparatus; wherein the N storage requests are used to request the memory to store N rows of output data generated by N processing elements having continuous identifications among the M processing elements, and Q is determined according to the number M of processing elements and the number N of storage requests; and storing a P-th row of output data generated by each of the M processing elements in a P-th polling by the memory of the electronic apparatus, according to Q×N storage requests received from the processor.

In a possible implementation of the present disclosure, the N storage requests are corresponding to the N processing elements having continuous identifications, each storage request includes a row of output data generated by a corresponding processing element and a first address of the row of output data generated by the corresponding processing element and intended to be stored in the memory;

the step of storing a P-th row of output data generated by each of the M processing elements in a P-th polling by the memory of the electronic apparatus, according to Q×N storage requests received from the processor, includes:

storing, by the memory of the electronic apparatus, the P-th row of output data generated by each of the M processing elements in the P-th polling, according to the first address of the P-th row of output data generated by each of the M processing elements intended to be stored in the memory.

In a possible implementation of the present disclosure, the method further includes:

obtaining M flag parameters of the M processing elements, and determining the first address of the row of output data generated by each of the M processing elements and intended to be stored in the memory, according to the M flag parameters the memory.

In a possible implementation of the present disclosure, the M flag parameters includes a first flag parameter that is a flag parameter corresponding to a i-th processing element; wherein, i is a positive integer less than or equal to M; the method further including:

grouping the M processing elements to obtain T processing element groups;

the step of determining the first address of the row of output data generated by each of the M processing elements and intended to be stored in the memory, according to the M flag parameters, includes:

when the first flag parameter is a first parameter, the first address of the row of output data generated by the i-th processing element and intended to be stored in the memory is: addr_start (i)=dm_init_addr+co_size*n, (n=1, 2, . . . , T); wherein, dm_init_addr is represented an initialization address; co_size is represented a size of an output channel of each layer network in a neural network model; N is represented a sequence number of the processing element group; the first parameter configured to determine the last-processing element in each group of the T processing element groups;

when the first flag parameter is a second parameter, the first address of the row of output data generated by the i-th processing element and intended to be stored in the memory is: addr_start (i)=addr_start (i−1)+16; wherein, addr_start (i−1) is represented a first address of a row of output data generated by a (i−1)-th processing element and intended to be stored in the memory; the second parameter configured to eliminate invalid processing elements of the M processing elements;

when the first flag parameter is a third parameter, the first address of the row of output data generated by the i-th processing element and intended to be stored in the memory is: addr_start (i)=addr_start (i−1)+16; wherein, addr_start (i−1) is represented the first address of the row of output data generated by the (i−1)-th processing element and intended to be stored in the memory; the third parameter configured to determine the first processing element in each group of the T processing element groups.

In a possible implementation of the present disclosure, the step of grouping the M processing elements, includes:

obtaining a width of the output channel of each layer network in the neural network model;

determining number S of the processing elements contained within one processing element group according to the width of the output channel of each layer network;

grouping the M processing elements to obtain the T processing element groups, according to the number S of the processing elements contained within the one processing element group.

In a possible implementation of the present disclosure, the Q is obtained by dividing the M by the N and by rounding up.

In a possible implementation of the present disclosure, when output data is generated by the processing element, the method further includes:

obtaining input data and compute instructions; wherein, the input data including weight data, input neuron data, and configuration parameters required for calculation;

according to the input data and the computation instruction, performing neural network computation to obtain the output data.

In a second aspect, an electronic apparatus according to an embodiment of the present disclosure includes a processor, an input device, an output device and a memory, the processor, the input device, the output device interconnected with the memory, the memory configured to store computer programs including program instructions, the processor configured to invoke the program instructions to implement the data processing method in the first aspect.

In a third aspect, a computer readable storage medium according to an embodiment of the present disclosure is configured to store computer programs, the computer programs including program instructions performed by a processor to implement the data processing method in the first aspect.

In a fourth aspect, a computer program according to an embodiment of the present disclosure includes program instructions performed by a processor to implement the data processing method in the first aspect.

The present disclosure provides the advantages as below.

In an embodiment of the present disclosure, the processor is configured to send a plurality of storage requests for multiple times to the memory in parallel in each polling, and then, the memory is configured to store output data generated by a plurality of processing elements simultaneously according to the plurality of storage requests, so as to solve the problem of low data storage efficiency in conventional neural network models, and improve storage efficiency of the neural network models.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof.

DETAILED DESCRIPTION

Figure 1:
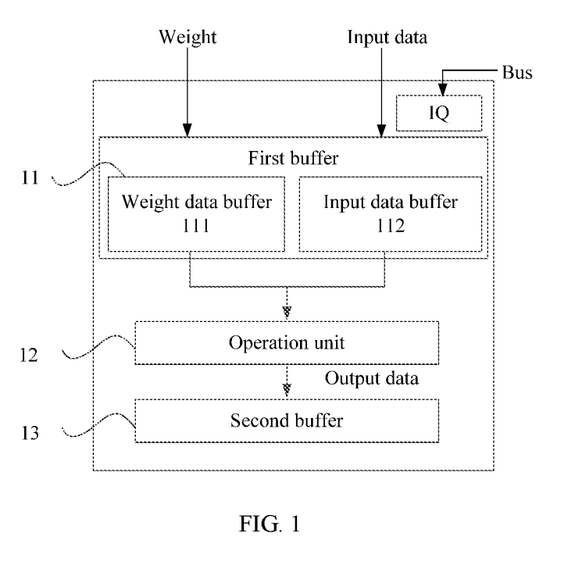
FIG. 1 is a schematic diagram of a processing element in accordance with an embodiment of the present disclosure.

In an embodiment of the present disclosure, FIG. 1 illustrates a schematic diagram of a processing element PE configured to realize neural network operations. The processing element PE includes: a first buffer 11 (that is, an input buffer), configured to store input data and weights corresponding to the input data, an operation unit 12 configured to perform neural network calculation based on the input data, and then generate output data; in here, the neural network calculation can be convolutional neural network calculation, or other neural network calculations; a second buffer 13 (that is, an output buffer) is configured to store the output data.

Furthermore, referring to FIG. 1, the first buffer 11, for example, can include an input data buffer 111 and a weight data buffer 112, wherein the input data buffer 111 is configured to store the input data, and the weight data buffer 112 configured to store the weights corresponding to the input data.

When performing convolution operation on an image, for example, a plurality of processing elements (PEs) is usually configured to perform convolution operation on image data of different parts of the image, respectively. Furthermore, Each PE is a single instruction-stream multiple data-stream (SIMD) processor with a digit width of m (or a vector processor with a digit width of m). In addition, each PE has its own instruction buffer IQ, instruction decoding and control logic, etc. Each PE can be configured to perform an independent convolutional neural network (CNN) calculation. Alternatively, the plurality of adjacent PEs can be combined together to jointly perform the convolutional neural network (CNN) calculation.

Figure 2:
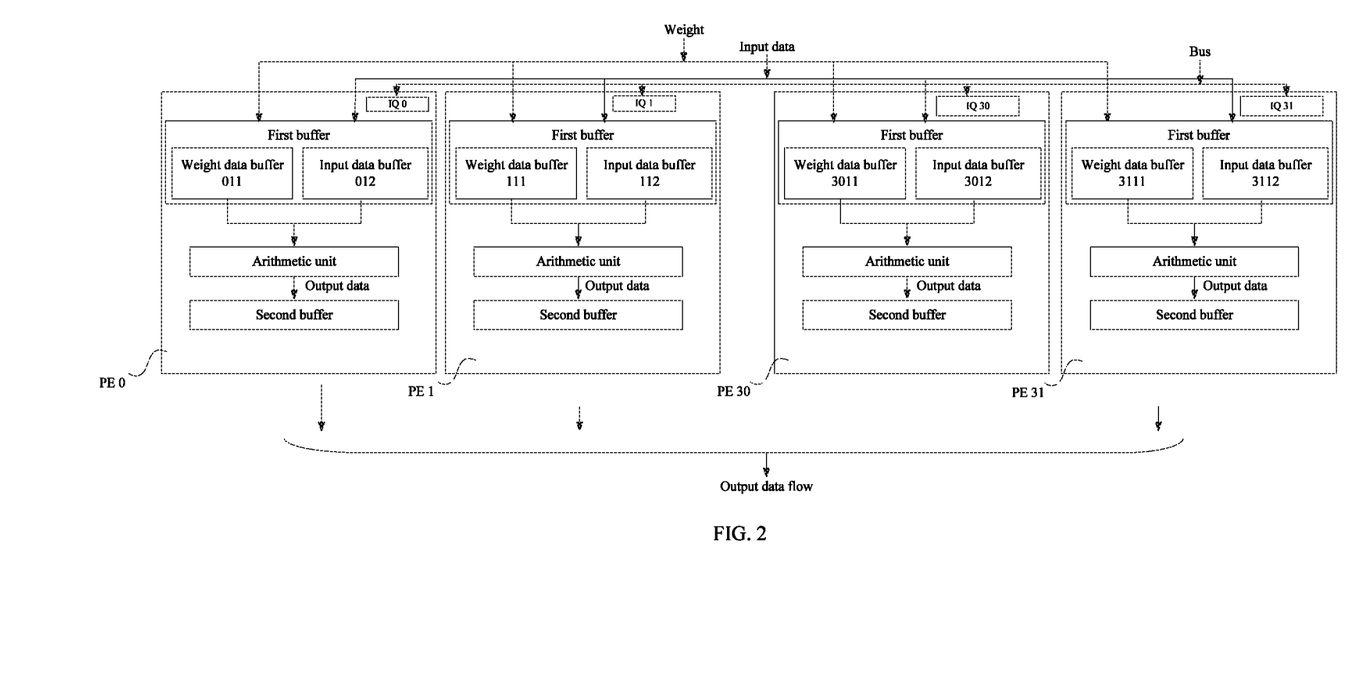
FIG. 2 is a schematic diagram of 32 processing elements in accordance with an embodiment of the present disclosure.

In a possible implementation of the present disclosure, the processor includes a plurality of processing elements (PEs) successively set according to identification sizes. The identification sizes sort can be represented as PE0, PE1, . . . , PEn. Referring to FIG. 2, it is assumed that the processor includes 32 PEs (PE0-PE31), each PE includes 7 MAC units, thereby, the processor includes 224 MAC. Each PE is a SIMD processor with 7 digit widths. Each PE includes its own instruction buffer IQ, instruction decoding and control logic, etc.

In each PE, there are three local buffers: i) an IBUF (corresponding to the input data buffer) configured to store the input data ci; ii) a WBUF (corresponding to the weight data buffer) configured to store the weights; and iii) an OBUF (corresponding to the second buffer) configured to store the output data co.

Figure 3:
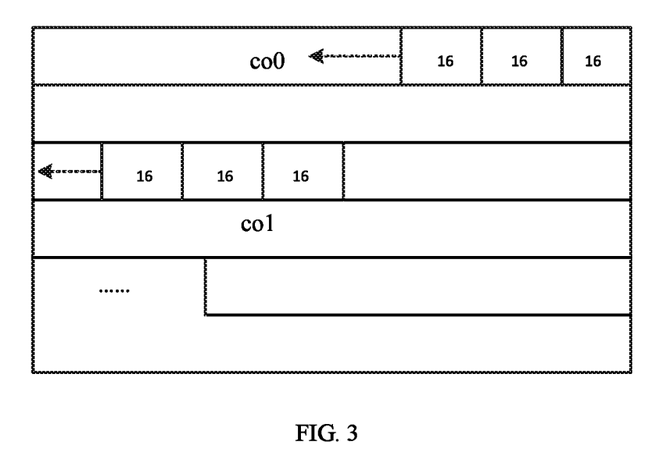
FIG. 3 is a schematic diagram of a data storage format in accordance with an embodiment of the present disclosure.

In an embodiment of the present disclosure, a format of data in a memory can be shown in FIG. 3. Taking that the neural network model is a convolutional neural network as an example, each data of feature map is 16 bits, and data of each channel is consecutively stored in the memory in a row. It is understandable that input feature map and output feature map of each layer of network calculation in the convolutional neural network model are stored in a format of continuous row storage.

A first parameter, a second parameter, a third parameter and a fourth parameter involved in the embodiment of the present disclosure are described below.

The first parameter, namely pe_low_vld_mask [m−1:0], is represented a low-order efficient processing element of each processing element group. For example, a number M of processing elements is equal to 32 and the 32 processing elements are divided into 8 processing element groups. When pe_low_vld_mask [M−1:0]=0x11111111, corresponding flag parameters of the 32 processing elements can be shown in Table 1:

TABLE 1

| processing element | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| flag parameter | 0 | 0 | 0 | 1 | 0 | 0 | 0 | 1 | 0 | 0 | 0 | 1 | 0 | 0 | 0 | 1 |
| processing element | 15 | 14 | 13 | 12 | 11 | 10 | 9 | 8 | 7 | 6 | 5 | 4 | 3 | 2 | 1 | 0 |
| flag parameter | 0 | 0 | 0 | 1 | 0 | 0 | 0 | 1 | 0 | 0 | 0 | 1 | 0 | 0 | 0 | 1 |

It can be seen from Table 1, according to a value of the first parameter, the least-significant-digit PE of each processing element group can be determined. Taking the processing elements PE0-PE3 of a PE group (PE_GROUP0) as an example, wherein the processing element PE0 is represented the least-significant-digit PE in the PE group PE_GROUP0. Because M processing elements can be grouped according to the first parameter, such implementation is convenient for subsequently determining a first address of each processing element in the M processing elements and can improve a storage speed.

The second parameter, namely pe_high_vld_mas[M−1:0], is represented a high-order efficient processing element of each processing element group. For example, the number M of processing elements is equal to 32 and the 32 processing elements are divided into 8 processing element groups. When pe_high_vld_mask[M−1:0]=0x88888888, corresponding flag parameters of the 32 processing elements can be shown in Table 2:

TABLE 2

| processing element | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| flag parameter | 1 | 0 | 0 | 0 | 1 | 0 | 0 | 0 | 1 | 0 | 0 | 0 | 1 | 0 | 0 | 0 |
| processing element | 15 | 14 | 13 | 12 | 11 | 10 | 9 | 8 | 7 | 6 | 5 | 4 | 3 | 2 | 1 | 0 |
| flag parameter | 1 | 0 | 0 | 0 | 1 | 0 | 0 | 0 | 1 | 0 | 0 | 0 | 1 | 0 | 0 | 0 |

It can be seen from Table 2, according to a value of the first parameter, the highest-significant-digit PE of each processing element group can be determined. Taking the processing elements PE0-PE3 of a PE group (PE_GROUP0) as an example, wherein the processing element PE3 is represented the highest-significant-digit PE in the PE group PE_GROUP0. Because the M processing elements can be grouped according to the second parameter, such implementation is convenient for subsequently determining a first address of each processing element in the M processing elements and can improve a storage speed.

The third parameter, namely pe_mac_mask [M−1:0], is represented whether the processing element is valid. For example, the number M of processing elements is equal to 32 and the 32 processing elements are divided into 8 processing element groups. When pe_mac_mask [M−1:0]=0x77777777, corresponding flag parameters of the 32 processing elements can be shown in Table 3:

TABLE 3

| processing element | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| flag parameter | 0 | 1 | 1 | 1 | 0 | 1 | 1 | 1 | 0 | 1 | 1 | 1 | 0 | 1 | 1 | 1 |
| processing element | 15 | 14 | 13 | 12 | 11 | 10 | 9 | 8 | 7 | 6 | 5 | 4 | 3 | 2 | 1 | 0 |
| flag parameter | 0 | 1 | 1 | 1 | 0 | 1 | 1 | 1 | 0 | 1 | 1 | 1 | 0 | 1 | 1 | 1 |

It can be seen from Table 3, taking the processing elements PE0-PE3 of a PE group (PE_GROUP0) as an example, according to the value of the third parameter, the actual effective processing element can be determined to the processing elements PE0-PE3, and the processing element PE4 is an invalid processing element, which does not produce an effective result. In an embodiment of the present disclosure, no storage requests are generated for the processing element PE, whose bit is zero in pe_mac_mask [m−1:0]. In this way, invalid processing elements PE can be eliminated, useless data writing and reading operations can be avoided, and computational efficiency of the neural network can be improved.

The fourth parameter, namely mac_boundary, is represented how many multiply-and-accumulate units (macs) are valid in the high-order effective processing element PE. For example, a high-order effective PE in a PE_group includes eight macs, when mac_boundary=0x7f, corresponding flag parameters of the 8 macs can be shown in Table 4:

TABLE 4

| mac | 7 | 6 | 5 | 4 | 3 | 2 | 1 | 0 |
|---|---|---|---|---|---|---|---|---|
| flag parameter | 0 | 1 | 1 | 1 | 1 | 1 | 1 | 1 |

It can be seen from Table 4, a resulting co is used only seven macs, in which case mac7 is invalid. It should be noted that data generated by an invalid mac isn't needed to be stored in the memory. In this way, invalid mac can be eliminated, useless data writing and reading operations can be avoided, and computational efficiency of the neural network can be improved.

In the conventional technologies, the processor is configured to only send one storage request at a time, and then the memory is configured to only store output data generated by one processing element at a time, which easily leads to the problem of low efficiency of data storage in the neural network model. In order to solve the above technical problem in the conventional technology, the present disclosure provides a data processing method, an electronic apparatus and a computer readable storage medium which can improve data storage efficiency and a computing speed of the neural network model by triggering a plurality of requests in parallel.

Figure 4:
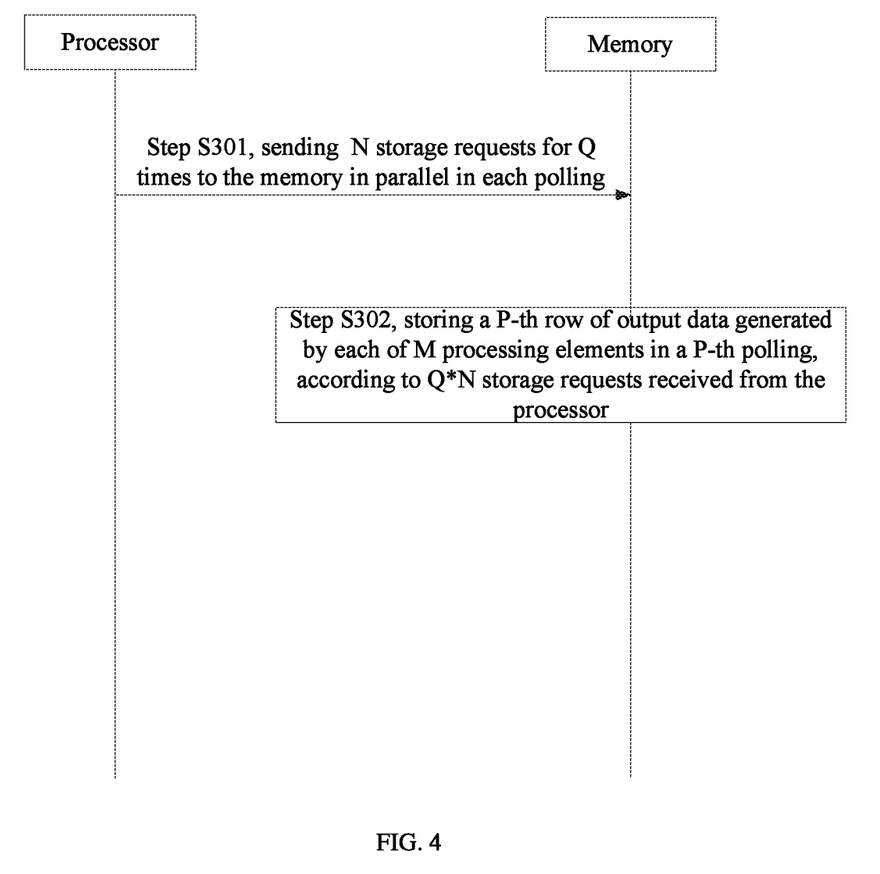
FIG. 4 is a flowchart of a data processing method in accordance with an embodiment of the present disclosure.

Based on the description above mentioned, and combined with FIG. 4 that illustrates a flowchart of a data processing method in accordance with an embodiment of the present disclosure, an embodiment of the present disclosure is to specifically explain how to data storage, which can include, but is not limited to, the following steps:

step S301, sending N storage requests for Q times to a memory in parallel in each polling by the processor of the electronic apparatus; wherein the N storage requests are used to request the memory to store N rows of output data generated by N processing elements having continuous identifications among the M processing elements, and Q is determined according to the number M of processing elements and the number N of storage requests.

In an embodiment of the present disclosure, the polling is a periodic repetitive process. In practical applications, one polling can include Q times of specific polling operations. From the point of the present disclosure, the N storage requests can be triggered for Q times within each polling. When the processor is configured to send the N storage requests for Q times to the memory in parallel within a polling, which is meant that the processor is configured to instruct the memory to store a P-th row of output data corresponding to each of the M processing elements within a P-th polling.

In an embodiment of the present disclosure, a number of pollings can be determined based on a row ordinal number of output data generated by each processing element. For example, the row ordinal number of output data generated by each processing element is J-th, when the processor sends storage requests for J-th pollings to the memory, at this point, the memory can store the J-th row of output data generated by each processing element according to the storage requests, which is also meant that the memory is finished storing the output data generated by each processing element according to the storage requests.

In a possible implementation of the present disclosure, a number of polling times Q within a polling can be determined according to the number of processing elements M and the number of storage requests N. For example, M=32, N=4, which means that the number of the pollings within a polling is 8. It is further known that, in this case, the N storage requests sent in parallel for each polling within a polling are valid.

In a possible implementation of the present disclosure, the Q is obtained by dividing the M by the N and by rounding up.

In a practical application, for example, the number of processing elements M=32, and the number of storage requests N=7, which means that the number of pollings within a polling is 5. Understandably, on a fifth polling within one polling, the processor sends seven storage requests to the memory (for example, the seven storage requests can be represented as A1, A2, . . . A7), it should be noted that, in the seven storage requests, storage request A1-A4 is valid and storage request A5-A7 is invalid. Here, when the memory can store the output data generated by the processing element based on a storage request, the storage request is valid.

In a possible implementation of the present disclosure, the step of output data being generated by the processing element, includes:

obtaining input data and compute instructions; wherein, the input data including weight data, input neuron data, and configuration parameters required for calculation;

according to the input data and the computation instructions, performing neural network computation to obtain the output data.

In an embodiment of the present disclosure, a way to obtain the input data and the compute instructions can be obtained through a data input/output unit, which can be one or more data I/O interfaces or I/O pins.

Furthermore, the computer instructions can include but are not limited to: neural network operational instructions (for example, convolutional neural network operational instructions), forward operational instructions or reverse operational instructions, etc. A specific implementation mode of the present disclosure isn't limited to specific manifestation of the computational instructions above.

The operation in the neural network can be an operation of one layer in the neural network. For a multi-layer neural network, the implementation process is as follows: In a forward operation, when a previous layer of the neural network is completed to be performed, the operation instructions of a next layer is taken output neurons (that is, the output data) calculated by the operation unit as input neurons of the next layer for operation (or perform some operations on the output neurons and then act as input neurons of the next layer). At the same time, weights are replaced as the weights of the next layer. In a reverse operation, when the reverse operation of the previous layer of the neural network is completed to be performed, the operation instructions of the next layer is taken input neuron gradients calculated by the operation unit as output neuron gradients of the next layer for operation (or perform some operations on the input neuron gradients and then act as the output neuron gradients of the next layer). At the same time, weights are also replaced as the weights of the next layer.

For the neural network operation, if the neural network operation has multi-layer operation, input neurons and output neurons of the multi-layer operation don't refer to, the neurons in an input layer and an output layer of the entire neural network, but for any two adjacent layers in the network, the neurons in a lower layer of network positive operation, that is, the input neurons, and the neurons in an upper layer of network positive operation is the output neurons. Taking a convolutional neural network model as an example, it is assumed that convolutional neural network includes L layers, K=1, 2, . . . , (L−1), for a K-th layer and a (K+1)-th layer, the K-th layer is referred to as an input layer, in which neurons are input neurons, and the (K+1)-th layer is referred to as an output layer, in which neurons are output neurons. In other words, each layer except a top layer can be used as the input layer, and a next layer is a corresponding output layer.

As mentioned above, in an embodiment of the present disclosure, for a i-th processing element (here, i is a positive integer less than or equal to M), the input data obtained by the i-th processing element is cached in the first buffer, and the output data generated by the i-th processing element according to the input data and the calculation instructions is cached in the second buffer.

In an embodiment of the present disclosure, the step of determining the first address of the row of output data generated by the M processing elements and intended to be stored in the memory, includes:

obtaining M flag parameters of the M processing elements, and determining the first address of the row of output data generated by each of the M processing elements and intended to be stored in the memory, according to the M flag parameters the memory.

Specifically, simultaneously scanning corresponding flag parameters of the M processing elements according to preset scanning sequences. In an embodiment of the present disclosure, the preset scanning sequences can include from low-bit to high-bit, or from high-bit to low-bit, etc., which is not specifically limited in the embodiment of the present disclosure.

In an embodiment of the present disclosure, the i-th processing element is taken as an example, and a corresponding flag parameter can be any of the first parameter, the second parameter or the third parameter.

Further optionally, the flag parameters can also include a fourth parameter configured to eliminate invalid macs from the processing element.

In a concrete implementation, the M flag parameters includes a first flag parameter that is a flag parameter corresponding to the i-th processing element; wherein, i is a positive integer less than or equal to M; the method further includes:

grouping the M processing elements to obtain T processing element groups;

the step of determining the first address of the row of output data generated by each of the M processing elements and intended to be stored in the memory, according to the M flag parameters, includes:

when the first flag parameter is a first parameter, the first address of the row of output data generated by the i-th processing element and intended to be stored in the memory is: addr_start (i)=dm_init_addr+co_size*n, (n=1, 2, . . . , T); wherein, dm_init_addr is represented an initialization address; co_size is represented a size of an output channel of each layer network in a neural network model; N is represented a sequence number of the processing element group; the first parameter configured to determine the last-processing element in each group of the T processing element groups;

In a possible implementation of the present disclosure, a sequence number of the processing element group can start from zero. For example, when T=8, the 8 processing element groups can be represented as a processing element group 0, a processing element group 1, . . . , a processing element group 7.

In another possible implementation of the present disclosure, the sequence number of the processing element group can be indicated to be started from 1. For example, when T=8, the 8 processing element groups can be represented as a processing element group 1, a processing element group 2, . . . , a processing element group 8. For a convenient illustration, in an embodiment of the present disclosure, n=1, 2, . . . , T.

Figure 5:
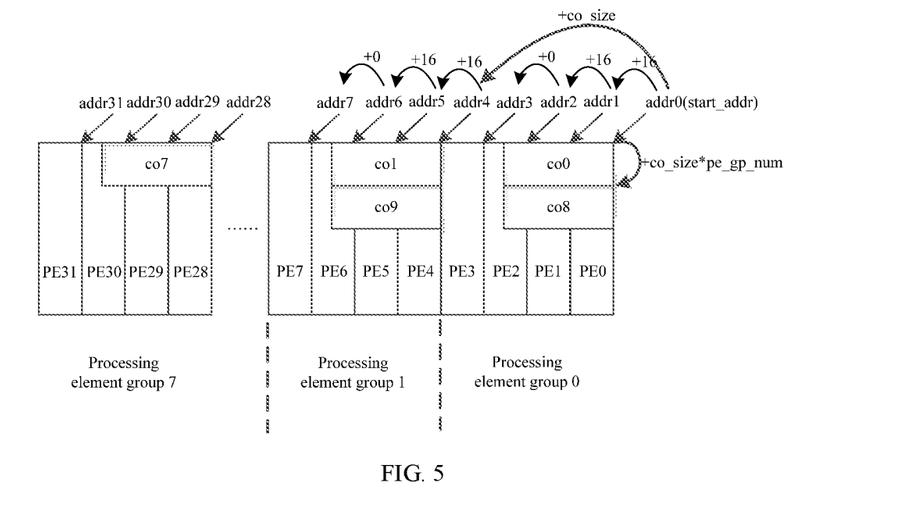
FIG. 5 is a schematic diagram of determining a first address of output data intended to be stored in a memory in accordance with an exemplary embodiment.

Referring to FIG. 5, a processing element group 0 and a processing element group 1 are taken as examples. The processing element group 0 includes the processing elements PE0-PE3, and the processing element group 1 includes the processing elements PE4-PE7. In a concrete implementation, the output data generated by two output channels are stored in corresponding OBUFs of the processing element group 0 and the processing element group 1, respectively. For example, Co0 and Co8 are stored in the OBUF of the processing element 0. In one case, the flag parameters corresponding to each of the eight processing elements can be shown in Table 5:

TABLE 5

| processing element | 7 | 6 | 5 | 4 | 3 | 2 | 1 | 0 |
|---|---|---|---|---|---|---|---|---|
| flag parameter | 0 | 0 | 0 | 1 | 0 | 0 | 0 | 1 |

It can be seen from Table 5, the least-significant-digit processing element in the processing element group 0 is the processing element PE0, when co0 is stored in the memory, the first address of the processing element PE0 is addr0. When cob is stored in memory, the first address corresponding to the processing element PE0 is: addr0+co_size*1.

When the first flag parameter is a second parameter, the first address of the row of output data generated by the i-th processing element and intended to be stored in the memory is: addr_start (i)=addr_start (i−1)+16; wherein, addr_start (i−1) is represented a first address of a row of output data generated by a (i−1)-th processing element and intended to be stored in the memory; the second parameter configured to eliminate invalid processing elements of the M processing elements;

referring to FIG. 5, the processing element group 0 is taken as an example, wherein the processing element group 0 includes the processing elements PE0-PE3. In one case, the flag parameters corresponding to each of the four processing elements can be shown in Table 6:

TABLE 6

| processing element | 3 | 2 | 1 | 0 |
|---|---|---|---|---|
| flag parameter | 1 | 1 | 1 | 1 |

It can be seen from Table 6, the processing elements PE0-PE3 are valid, it is assumed that the first address of the processing element PE0 is addr0, at this time, the first address of the processing element PE1 is: addr1=addr0+16, the first address of the processing element PE2 is: addr2=addr1+16, and the first address of the processing element PE3 is: addr3=addr2+16.

When the first flag parameter is a third parameter, the first address of the row of output data generated by the i-th processing element and intended to be stored in the memory is: addr_start (i)=addr_start (i−1)+16; wherein, addr_start (i−1) is represented the first address of the row of output data generated by the (i−1)-th processing element and intended to be stored in the memory; the third parameter configured to determine the first processing element in each group of the T processing element groups.

Referring to FIG. 5, a processing element group 0 and a processing element group 1 are taken as examples. The processing element group 0 includes the processing elements PE0-PE3, and the processing element group 1 includes the processing elements PE4-PE7. In one case, the flag parameters corresponding to each of the eight processing elements can be shown in Table 7:

TABLE 7

| processing element | 7 | 6 | 5 | 4 | 3 | 2 | 1 | 0 |
|---|---|---|---|---|---|---|---|---|
| flag parameter | 1 | 0 | 0 | 0 | 1 | 0 | 0 | 0 |

It can be seen from Table 7, the highest-significant-digit processing element in the processing element group 0 is the processing element PE3, and the highest-significant-digit processing element in the processing element group 1 is the processing element PE7. It is assumed that the first address of the processing element PE3 is add0, because the processing elements PE3-PE6 are invalid, at this time, the first address of the processing element PE4 is: addr4=addr0+16.

In a concrete implementation, when grouping the M processing elements, includes:

obtaining a width of the output channel of each layer network in the neural network model;

determining number S of the processing elements contained within one processing element group according to the width of the output channel of each layer network;

grouping the M processing elements to obtain the T processing element groups, according to the number S of the processing elements contained within the one processing element group.

In an embodiment of the present disclosure, in order to meet computational requirements, a number of the processing elements contained within a processing element group can be determined based on a width of the output channels in each layer network in the neural network. Specifically, for a convolutional neural network, each convolution kernel has three dimensions: a length, a width and a height. Here, during calculating the convolutional neural network, a width of the output channel is equal to a width of the convolution kernel. For example, it is assumed that a output feature map of a layer in a convolutional neural network model has 10 output channels, and 4 processing elements are needed to be combined to form a processing element group to complete calculation of an output channel. In this case, when M=32, the 32 processing elements are divided into 8 groups, each processing element group includes 4 processing elements, and each processing element group is configured to complete the calculation of different output channels. For example, the processing element group PE_GROUP0 is configured to complete the calculation of an output channel 1, the processing element group PE_GROUP1 is configured to complete the calculation of an output channel 2, and so on.

Step S302, storing a P-th row of output data generated by each of the M processing elements in a P-th polling by the memory of the electronic apparatus, according to Q×N storage requests received from the processor.

In a concrete implementation, the N storage requests are corresponding to the N processing elements having continuous identifications, each storage request includes a row of output data generated by a corresponding processing element, and a first address of the row of output data generated by the corresponding processing element and intended to be stored in the memory;

the step of storing a P-th row of output data generated by each of the M processing elements in a P-th polling by the memory of the electronic apparatus, according to Q×N storage requests received from the processor, including:

storing, by the memory of the electronic apparatus, the P-th row of output data generated by each of the M processing elements in the P-th polling, according to the first address of the P-th row of output data generated by each of the M processing elements intended to be stored in the memory.

In an embodiment of the present disclosure, each storage request also includes identity information of the corresponding processing element, the identity information can be configured to distinguish different storage requests.

In an embodiment of the present disclosure, in a polling, sending N storage requests for Q times to the memory in parallel by the processor of the electronic apparatus. Taking M=32, the number of storage requests N=4, the number of the pollings Q=8, in a first polling within one polling, four storage requests are configured to request the memory to store a row of output data generated by each of the four processing elements with continuous identifications, PE0-PE3; in a second polling time within the one polling, four storage requests are configured to request the memory to store a row of output data generated by each of the four processing elements with continuous identifications, PE4-PE7. Understandably, in an eighth polling within the one polling, four storage requests are configured to request the memory to store a row of output data generated by each of the four processing elements with continuous identifications, PE28-PE31. As it can be seen, after the one single polling, the memory can be configured to implement to store the row of output data generated by each of the 32 processing elements.

In this way, after the one single polling, a row of output data generated by each of the M processing components can be stored. In this case, an address of the second buffer corresponding to each of the M processing elements can be updated; for example, the updated address is:

addr (Q)=addr_start+co_line_num*co_line_size, wherein, addr_start is represented the first address of each of the 32 processing elements, co_line_num is represented a row number of the output data, co_line_size is represented a size of the output data per row.

Understandably, in a next polling, the memory is configured to store another row of output data generated by each of the M processing elements according to preset rules. For example, in the second polling, the memory is configured to store a second row of output data generated by each of the M processing elements according to the preset rules. When the number of the pollings is equal to the number of rows of output data generated by the processing elements, it is meant that the memory has finished storing a plurality of rows of output data generated by the M processing elements.

In an embodiment of the present disclosure, The memory can be consist of a plurality of several static random access memories (SRAM, static ram), if two of addresses of the N storage requests (for example, four storage requests) are mapped to the same SRAM and the other two are mapped to other SRAMs, then two of the four storage requests will access the same SRAM, thereby a conflict is occurred. In order to resolve the above conflict, storage requests accessing the same SRAM are needed to be accessed in two cycles, respectively. So, a controller of the memory is configured to complete three non-conflicting SRAM storage requests in a first cycle and the remaining one SRAM storage request in a second cycle. In this way, a storage conflict of the data storage process in the neural network model can be avoided.

In order to more conveniently understand, specific examples are combined to be elaborated below. For example, a layer network in the neural network model includes 10 output channels, and four processing elements are combined together to form a processing element group to complete the calculation of an output channel. In this case, when M=32, it is meant that the 32 processing elements are divided into 8 groups (including a processing element group 0 to a processing element group 7), each processing element group includes four processing elements, and each processing element group is configured to complete the calculation of different output channels. After completing the calculation of the layer, the output data stored in the second buffer of each processing element is shown in FIG. 5, the output data generated by two output channels are stored in the OBUFs of the processing element group 0 and the processing element group 1, and the output data generated by one output channel is stored in the OBUF of other processing element groups. It should be noted that, in FIG. 3, the number of the processing elements actually involved in the calculation in each processing element group is two and half, the highest bit processing element PE of each processing element group doesn't produce a valid result, but the highest bit processing element PE does the calculation for a low bit processing element to enhance raw data. According to the storage request, the memory is configured to store corresponding output data co of each of the eight processing element groups, and then act as the input data ci of a next layer to participate in calculation.

Four storage requests sent by the processor to the memory in parallel is taken as an example, according to the storage requests, a realization process of storing the corresponding output data co of the above eight processing element groups in the memory can include:

the processor is configured to send the four storage requests in parallel to the memory in one polling, wherein, the number of pollings within one polling is eight. In a first polling time within the one polling, the memory is configured to store a row of output data generated by each of the four processing elements PE0-PE3, according to preset rules. When the memory is configured to store a row of output data generated by each of the four processing elements PE0-PE3 according to the four storage requests, flag parameters corresponding to the four processing elements are scanned from low-bit to high-bit, for example, the flag parameters corresponding to each of the four processing elements is the second parameter, taking the first processing element as an example, in the case that the flag parameter corresponding to the first processing element obtained is the second parameter, at this time, it is determined that the first address of a row of output data generated by a first processing element intended to be stored in the memory is addr0. Similarly, it is determined that the first address of a row of output data generated by a second processing element intended to be stored in the memory is addr1, wherein, addr1=addr0+16. It is determined that the first address of a row of output data generated by a third processing element intended to be stored in the memory is addr2, wherein, addr2=addr1+16; it is determined that the first address of a row of output data generated by a fourth processing element intended to be stored in the memory is addr3, wherein, addr3=addr2+0. After that, the memory is configured to store a first row of output data generated by the first processing element according to the first address (addr0) that is intended to be stored in the memory corresponding to the output data of the first processing element (namely PE0). In a similar way, the memory is configured to store a first row of output data generated by the second processing element according to the first address (addr1) that is intended to be stored in the memory corresponding to the output data of the second processing element (namely PE1); the memory is configured to store a first row of output data generated by the third processing element according to the first address (addr2) that is intended to be stored in the memory corresponding to the output data of the third processing element (namely PE2); the memory is configured to store a first row of output data generated by the fourth processing element according to the first address (addr3) that is intended to be stored in the memory corresponding to the output data of the fourth processing element (namely PE3).

In this way, after the first polling, the memory is configured to complete storing the first row of output data of each of the 32 processing elements. In this case, an address of the second buffer corresponding to each of the 32 processing elements can be updated.

After that, according to the updated address, the output data of a second row corresponding to each of the 32 processing elements is stored in the memory within a second polling, and the above implementation process is repeated until all rows of output data of co0-col in the OBUF is stored.

Furthermore, after co0-col in the OBUF is stored, when storing co8-co9, at this time, an address of the co is needed to be switched, the address after being switched is: addr=addr_start (K)+obuf_co_num*co_size; wherein, addr_start (K) is represented an initial address of co, obuf_co_num is represented a serial number of co in the OBUF; co_size is represented a size of co. In this case, as shown in FIG. 5, since M=8 and N=4, it is meant that the processor is configured to send four storage requests to the memory in parallel in each polling, a number of polling times within one polling is 2. In a first polling time within a first polling, four storage requests are configured to request the memory to store a first row of output data generated by each of the four processing elements with continuous identification, PE0-PE3; In a second polling time within a first polling, four storage requests are configured to request the memory to store a second row of output data generated by each of the four processing elements with continuous identification, PE4-PE7. As it can be seen, after the first polling, the memory can be configured to implement to store the first row of output data generated by each of the 8 processing elements, in practical applications, specific implementations of storing the second row of output data corresponding to each of the eight processing elements can be seen from the above description, which will not be repeated here.

By implementing the embodiments of the present disclosure, the processor can be configured to send a plurality of storage requests to the memory in parallel in one cycle, the memory is configured to store output data generated by a plurality of processing elements simultaneously according to the plurality of storage requests, so as to solve the problem of low data storage efficiency in the conventional neural network model, improve data storage efficiency, and computational efficiency of the neural network model.

Figure 6:
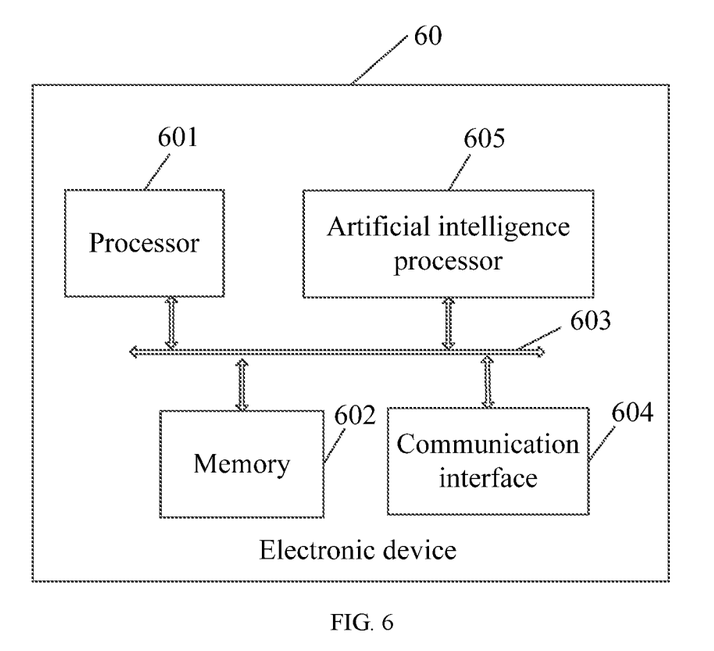
FIG. 6 is a schematic diagram of an electronic apparatus in accordance with an embodiment of the present disclosure.

FIG. 6 illustrates a schematic diagram of an electronic apparatus in accordance with an embodiment of the present disclosure. The electronic apparatus can include: a processor 601, a memory 602, a communication bus 603 and a communication interface 604. The processor 601 is connected to the memory 602 and the communication interface 604 through the communication bus 603.

Optionally, the electronic apparatus 60 can also include an artificial intelligence (AI) processor 605 as a coprocessor mounted on a main central processing unit (CPU), the main CPU is configured to assign tasks to the artificial intelligence processor 605. The artificial intelligence processor 605 can be configured to implement one or more operations involved in the above data processing method. For example, a network processing unit (NPU) is taken as an example, a core part of the NPU is an arithmetic circuit, which is controlled by the controller to extract matrix data from the memory 602 and then perform multiplication and addition operation on the matrix data.

In an embodiment of the present disclosure, the electronic apparatus 60 is configured to send N storage requests for Q times in parallel to the memory 602 in each polling by the processor 601; wherein the N storage requests are used to request the memory 602 to store N rows of output data generated by N processing elements having continuous identifications among the M processing elements, and Q is determined according to the number M of processing elements and the number N of storage requests;

The electronic apparatus 60, through the memory 602, is configured to store a P-th row of output data generated by each of the M processing elements in a P-th polling, according to Q×N storage requests received from the processor.

Furthermore, the N storage requests are corresponding to the N processing elements having continuous identifications, each storage request includes a row of output data generated by a corresponding processing element and a first address of the row of output data generated by the corresponding processing element and intended to be stored in the memory;

The electronic apparatus 60, through the memory 602, configured to store the P-th row of output data generated by each of the M processing elements in a P-th polling, according to Q×N storage requests received from the processor, includes:

the electronic apparatus 60 is configured to store, by the memory 602, the P-th row of output data generated by each of the M processing elements in the P-th polling, according to the first address of the P-th row of output data generated by each of the M processing elements intended to be stored in the memory 602.

Furthermore, the method further includes:

obtaining M flag parameters of the M processing elements, and determining the first address of the row of output data generated by each of the M processing elements and intended to be stored in the memory, according to the M flag parameters.

Furthermore, the M flag parameters includes a first flag parameter that is a flag parameter corresponding to a i-th processing element; wherein, i is a positive integer less than or equal to M; the method further includes:

the processor 601 is configured to group the M processing elements to obtain T processing element groups;

the processor 601 configured to determine the first address of the row of output data generated by each of the M processing elements and intended to be stored in the memory, according to the M flag parameters, includes:

when the first flag parameter is a first parameter, the first address of the row of output data generated by the i-th processing element and intended to be stored in the memory is: addr_start (i)=dm_init_addr+co_size*n, (n=1, 2, . . . , T); wherein, dm_init_addr is represented an initialization address; co_size is represented a size of an output channel of each layer network in a neural network model; N is represented a sequence number of the processing element group; the first parameter configured to determine the last-processing element in each group of the T processing element groups;

when the first flag parameter is a second parameter, the first address of the row of output data generated by the i-th processing element and intended to be stored in the memory is: addr_start (i)=addr_start (i−1)+16; wherein, addr_start (i−1) is represented a first address of a row of output data generated by a (i−1)-th processing element and intended to be stored in the memory; the second parameter configured to eliminate invalid processing elements of the M processing elements;

when the first flag parameter is a third parameter, the first address of the row of output data generated by the i-th processing element and intended to be stored in the memory is: addr_start (i)=addr_start (i−1)+16; wherein, addr_start (i−1) is represented the first address of the row of output data generated by the (i−1)-th processing element and intended to be stored in the memory; the third parameter configured to determine the first processing element in each group of the T processing element groups.

Furthermore, the processor 601 configured to group the M processing elements, includes:

obtaining a width of the output channel of each layer network in the neural network model;

determining number S of the processing elements contained within one processing element group according to the width of the output channel of each layer network;

grouping the M processing elements to obtain the T processing element groups, according to the number S of the processing elements contained within the one processing element group.

A computer readable storage medium according to an embodiment of the present disclosure configured to store computer software instructions used for the electronic apparatus shown in FIG. 4 above, includes programs performed by a processor to implement the data processing method in the embodiments of the present disclosure, thereby data storage efficiency of the neural network model can be improved.

As it can be seen above, the present disclosure provides a data processing method, an electronic apparatus and a computer readable storage medium, which can simultaneously store a plurality of pieces of data by triggering concurrent requests to improve storage efficiency.

What is claimed is:

1. A data processing method applied to an electronic apparatus, the electronic apparatus comprising a processor and a memory, the processor comprising M processing elements, each processing element comprising an identification, and the M processing elements arranged in sequence according to the identifications, wherein M is a positive integer, the method comprising:

sending N storage requests for Q times to the memory in parallel in each polling using the processor of the electronic apparatus; wherein the N storage requests are used to request the memory to store N rows of output data generated by N processing elements having continuous identifications among the M processing elements, and Q is determined according to the number M of the processing elements and the number N of the storage requests; and storing a P-th row of output data generated by each of the M processing elements in a P-th polling using the memory of the electronic apparatus, according to Q×N storage requests received from the processor; and wherein the N storage requests are corresponding to the N processing elements having continuous identifications, each storage request comprises a row of output data generated by a corresponding processing element and a first address of the row of output data generated by the corresponding processing element and intended to be stored in the memory;

the step of storing a P-th row of output data generated by each of the M processing elements in a P-th polling using the memory of the electronic apparatus, according to Q×N storage requests received from the processor, comprising:

storing the P-th row of output data generated by each of the M processing elements in the P-th polling using the memory of the electronic apparatus, according to the first address of the P-th row of output data generated by each of the M processing elements intended to be stored in the memory.

2. The data processing method as claimed in claim 1, wherein the method further comprises:

obtaining M flag parameters of the M processing elements, and determining the first address of the row of output data generated by each of the M processing elements and intended to be stored in the memory, according to the M flag parameters.

3. The data processing method as claimed in claim 2, wherein the M flag parameters comprises a first flag parameter that is a flag parameter corresponding to a i-th processing element; wherein, i is a positive integer less than or equal to M; the method further comprising:

grouping the M processing elements to obtain T processing element groups;

the step of determining the first address of the row of output data generated by each of the M processing elements and intended to be stored in the memory, according to the M flag parameters, comprising:

when the first flag parameter is a first parameter, the first address of the row of output data generated by the i-th processing element and intended to be stored in the memory is: addr_start (i)=dm_init_addr+co_size*n, (n=1, 2, ..., T), wherein, dm_init_addr is represented an initialization address; co_size is represented a size of an output channel of each layer network in a neural network model; N is represented a sequence number of the processing element group; the first parameter configured to determine the last-processing element in each group of the T processing element groups;

when the first flag parameter is a second parameter, the first address of the row of output data generated by the i-th processing element and intended to be stored in the memory is: addr_start (i)=addr_start (i−1)+16; wherein, addr_start (i−1) is represented a first address of a row of output data generated by a (i−1)-th processing element and intended to be stored in the memory; the second parameter configured to eliminate invalid processing elements of the M processing elements;

when the first flag parameter is a third parameter, the first address of the row of output data generated by the i-th processing element and intended to be stored in the memory is: addr_start (i)=addr_start (i−1)+16; wherein, addr_start (i−1) is represented the first address of the row of output data generated by the (i−1)-th processing element and intended to be stored in the memory; the third parameter configured to determine the first processing element in each group of the T processing element groups.

4. The data processing method as claimed in claim 3, wherein the step of grouping the M processing elements, comprises:

obtaining a width of the output channel of each layer network in the neural network model;

determining a number S of the processing elements contained within one processing element group according to the width of the output channel of each layer network;

grouping the M processing elements to obtain the T processing element groups, according to the number S of the processing elements contained within the one processing element group.

5. The data processing method as claimed in claim 1, wherein the Q is obtained by dividing the M by the N and by rounding up.

6. The data processing method as claimed in claim 1, wherein when the output data is generated by the processing element, the method further comprises:

obtaining input data and compute instructions; wherein, the input data comprising weight data, input neuron data, and configuration parameters required for calculation;

according to the input data and the computation instructions, performing a neural network computation to obtain the output data.

7. An electronic apparatus comprising a processor, an input device, an output device and a memory, the processor, the input device, the output device interconnected with the memory, the memory configured to store computer programs comprising program instructions, the processor configured to invoke the program instructions to implement a data processing method, and comprising M processing elements, each processing element comprising an identification, and the M processing elements arranged in sequence according to the identifications, wherein M is a positive integer, the method comprising:

sending N storage requests for Q times to the memory in parallel in each polling using the processor of the electronic apparatus; wherein the N storage requests are used to request the memory to store N rows of output data generated by N processing elements having continuous identifications among the M processing elements, and Q is determined according to the number M of the processing elements and the number N of the storage requests; and storing a P-th row of output data generated by each of the M processing elements in a P-th polling using the memory of the electronic apparatus, according to Q×N storage requests received from the processor; and wherein the N storage requests are corresponding to the N processing elements having continuous identifications, each storage request comprises a row of output data generated by a corresponding processing element and a first address of the row of output data generated by the corresponding processing element and intended to be stored in the memory;

the step of storing a P-th row of output data generated by each of the M processing elements in a P-th polling using the memory of the electronic apparatus, according to Q×N storage requests received from the processor, comprising:

storing the P-th row of output data generated by each of the M processing elements in the P-th polling using the memory of the electronic apparatus, according to the first address of the P-th row of output data generated by each of the M processing elements intended to be stored in the memory.

8. A non-transitory computer readable storage medium applied to an electronic apparatus comprising a processor, a memory and configured to store computer programs, the computer programs comprising program instructions performed by using the processor of the electronic apparatus to implement a data processing method, the processor comprising M processing elements, each processing element comprising an identification, and the M processing elements arranged in sequence according to the identifications, wherein M is a positive integer, the method comprising:

sending N storage requests for Q times to the memory in parallel in each polling using the processor of the electronic apparatus; wherein the N storage requests are used to request the memory to store N rows of output data generated by N processing elements having continuous identifications among the M processing elements, and Q is determined according to the number M of the processing elements and the number N of the storage requests; and storing a P-th row of output data generated by each of the M processing elements in a P-th polling using the memory of the electronic apparatus, according to Q×N storage requests received from the processor; and wherein the N storage requests are corresponding to the N processing elements having continuous identifications, each storage request comprises a row of output data generated by a corresponding processing element and a first address of the row of output data generated by the corresponding processing element and intended to be stored in the memory;

the step of storing a P-th row of output data generated by each of the M processing elements in a P-th polling using the memory, according to Q×N storage requests received from the processor, comprising:

storing the P-th row of output data generated by each of the M processing elements in the P-th polling using the memory, according to the first address of the P-th row of output data generated by each of the M processing elements intended to be stored in the memory.

* * * * *